US008920590B1

(12) United States Patent
Cummings et al.

(10) Patent No.: US 8,920,590 B1
(45) Date of Patent: Dec. 30, 2014

(54) TAMPER EVIDENT SEAL FOR A MEDICAL CONTAINER

(75) Inventors: Gary W. Cummings, Richardson, TX (US); Christopher A. Davies, Sandy, UT (US); Richard B. Davies, Sandy, UT (US)

(73) Assignee: Winfield Laboratories, Inc., Richardson, TX (US)

( * ) Notice: Subject to any disclaimer, the term of this patent is extended or adjusted under 35 U.S.C. 154(b) by 150 days.

(21) Appl. No.: 12/924,220

(22) Filed: Sep. 23, 2010

Related U.S. Application Data (63) Continuation-in-part of application No. 12/075,505, filed on Mar. 12, 2008, now abandoned, which is a continuation of application No. 10/822,523, filed on Apr. 12, 2004, now abandoned.

(60) Provisional application No. 60/462,660, filed on Apr. 14, 2003.

(51) Int. Cl.
*B32B 38/00* (2006.01)
*B32B 38/04* (2006.01)
*B65D 51/20* (2006.01)
*A61J 1/14* (2006.01)

(52) U.S. Cl.
CPC .............. *B65D 51/20* (2013.01); *A61J 1/1475* (2013.01)
USPC ........... 156/253; 156/250; 156/252; 156/256; 156/267; 156/269; 156/295

(58) Field of Classification Search
CPC ........ B32B 38/00; B32B 38/04; B32B 38/10; A61J 1/1406; A61J 1/1412; A61J 1/1475; A65D 51/18; A65D 51/20
USPC .......... 156/250, 252, 253, 256, 267, 269, 295
See application file for complete search history.

(56) References Cited

U.S. PATENT DOCUMENTS

| 2,402,631 | A | * | 6/1946 | Hull ............................ 156/275.1 |
| 3,444,732 | A | * | 5/1969 | McKinley et al. ........... 73/150 A |
| 3,826,701 | A | * | 7/1974 | Miller ........................... 156/359 |
| 3,925,139 | A | * | 12/1975 | Simmons ...................... 156/358 |
| 4,035,334 | A | | 7/1977 | Davydov et al. |
| 4,107,861 | A | | 8/1978 | Johnson |
| 4,266,687 | A | | 5/1981 | Cummings |
| 4,390,104 | A | | 6/1983 | Cummings |
| 4,423,819 | A | | 1/1984 | Cummings |
| 4,514,248 | A | | 4/1985 | Cummings |
| 4,527,703 | A | | 7/1985 | Cummings |

(Continued)

OTHER PUBLICATIONS

U.S. Clinical Products, Inc., Commercialized Singletary Seal, more than one year prior to Apr. 14, 2003.

*Primary Examiner* — Mark A Osele
*Assistant Examiner* — Christopher C Caillouet
(74) *Attorney, Agent, or Firm* — Roger N. Chauza, PC (57) ABSTRACT

A seal formed of laminated films adhered to a peel strip. The seal includes a target area free of adhesive, and adhesive surrounding the target area. The seal is formed so that the target area is visually distinguished from the surrounding adhesive to facilitate placement of the seal on a medical container by a user. The use of a colored adhesive, reflectivity of the adhesive, a colored laminate, or a colored target background can be utilized to make the target area visually different from the surrounding adhesive.

14 Claims, 3 Drawing Sheets

(56) References Cited

U.S. PATENT DOCUMENTS

| | | |
|---|---|---|
| 4,550,842 A | 11/1985 | Cummings |
| 4,598,834 A | 7/1986 | Singletary, Jr. |
| 4,661,189 A | 4/1987 | Voy et al. |
| 4,758,456 A | 7/1988 | Muscala |
| 4,960,216 A | 10/1990 | Giles et al. |
| 5,197,617 A | 3/1993 | Edwards |
| 5,342,673 A | 8/1994 | Bowman et al. |
| 5,516,583 A | 5/1996 | Zhang et al. |
| 5,564,834 A | 10/1996 | Porchia et al. |
| 5,942,062 A * | 8/1999 | Hassall et al. .................. 156/87 |
| 6,461,467 B2 * | 10/2002 | Blatchford et al. ........... 156/230 |
| 6,531,025 B1 | 3/2003 | Lender et al. |
| 6,578,723 B1 | 6/2003 | Tyner |
| 6,589,616 B2 | 7/2003 | Muggli et al. |
| 6,632,403 B1 | 10/2003 | Barmore et al. |
| 7,135,088 B2 | 11/2006 | Lasson |
| 7,318,590 B2 | 1/2008 | Razavi |
| 2003/0196914 A1 | 10/2003 | Tzou et al. |
| 2005/0022924 A1* | 2/2005 | Blackburn .................... 156/230 |
| 2008/0150186 A1* | 6/2008 | Abrams ....................... 264/130 |

* cited by examiner

TAMPER EVIDENT SEAL FOR A MEDICAL CONTAINER

RELATED APPLICATIONS

This is a continuation-in-part patent application of pending U.S. patent application Ser. No. 12/075,505 filed Mar. 12, 2008 now abandoned, which a continuation of U.S. patent application filed Apr. 12, 2004, Ser. No. 10/822,523 now abandoned, which claims the benefit of U.S. provisional patent application No. 60/462,660 filed Apr. 14, 2003, entitled "Tamper Evident Seal," the disclosures of which are all incorporated herein by reference.

TECHNICAL FIELD OF THE INVENTION

The present invention relates in general to methods and apparatus for sealing medical containers, and more particularly to techniques that allow a person to accurately align a non-adhesive target area of the seal to a membrane of a medical container.

BACKGROUND OF THE INVENTION

Hospital patients often undergo treatments of many types using intravenous injections of liquids such as antibiotics, vitamins, drugs, narcotics and many other pharmaceuticals. The injection of the liquid is administered into the veins of the patient. As such, it is important that the intravenous process and equipment remain clean and sterile in order to reduce the possibility of allowing bacteria and other undesirable organisms to enter the body of the patient.

Intravenous solutions may include dextrose solutions, sodium chloride and many other solutions. Such solutions can be injected by intravenous means into a patient, and such solutions can be modified to add other treatment liquids, including those noted above. Intravenous (IV) bags are typically delivered to hospitals or pharmacies with the base solutions of dextrose, sodium chloride, etc. The IV bags are generally delivered within individual protective plastic shipping bags to maintain the IV bags in a sterile condition. The hospital assistant or the pharmacist then removes the IV bags containing the IV solution from the protective plastic cover and discards the latter. In a typical day at many hospitals, clinics and pharmacies, several hundred IV bags may be processed so as to have the proper pharmaceutical solution added to the IV solution, as prescribed by the doctors.

The pharmacist, for example, may have delivered to him/her multiple sheets of adhesive labels from the hospital, where each label is preprinted with information which identifies the patient, the size of the IV bag, the medical solutions to be added, the dosages thereof, and other parameters necessary for the proper administration of IV solutions to the correct patient. The preparation of IV bags for the proper modification of medical solutions is conducted in a clean and sterile environment, usually under a laminar air flow hood. The IV bags are removed from the respective protective coverings in the sterile environment. The pharmacist then identifies the drug to be added to the base IV solution in the bag. The drug is drawn into a syringe, or the like, from a bottle and then added to the IV bag by way of the injection port. The injection port of an IV bag includes a spout or portion extending from the bag, with a self-sealing rubber membrane through which the syringe needle is inserted to inject the drug into the IV bag. When the needle is withdrawn, the rubber membrane reseals to maintain the contents of the IV bag sterile.

Once the base IV solution has been modified in the manner desired, an adhesive seal is applied to the injection port of the IV bag. The adhesive seals are generally of a laminated construction, including a foil and one or more layers of a polypropylene material. The type of seals typically applied to injection ports of IV bags and bottles are disclosed in U.S. Pat. No. 4,266,687 by Cummings; U.S. Pat. No. 4,390,104 by Cummings; U.S. Pat. No. 4,423,819 by Cummings; U.S. Pat. No. 4,514,248 by Cummings; U.S. Pat. No. 4,527,703 by Cummings and U.S. Pat. No. 4,598,834 by Singletary. These seals include a target area surrounded by adhesive. The target area is a non-adhesive spot on the seal that contacts the rubber membrane of the injection port. The surrounding area is adhesive covered for adhering to the spout portion of the injection port. Importantly, the seal not only maintains the rubber membrane covered and free from bacteria contamination, but the seal includes slits cut therein so that if attempted to be removed, the seal is torn or otherwise destroyed. Accordingly, any tampering of the seal is readily evident. Lastly, the presence of a seal on the injection port of the IV bag is an indication to the pharmacist that the modification of the contents of the IV bag is complete, and no other processing of the IV bag is required. The presence of the seal on the container thus prevents the accidental injection therein of an additional medication, or a different medication.

In the manufacture of the IV bag seals noted in the above-identified patents, the target area is free from adhesive in that the adhesive at that spot is covered by a paper dot. The seal also includes a pull tab that has a non-adhesive underside, also covered by paper adhered to the adhesive. Thus, the seal is fabricated by covering the entire underside of the laminated foil/poly strip with an adhesive. Paper is then applied to those areas in which it is desired to be non-adherent. Lastly, a silicone-faced peel strip is attached to the adhesive side of the seal. The peel strip is removed from the seal just prior to use by the pharmacist when applying the seal over the injection port of the IV bag.

While the IV bag seals of the prior art have adequately provided their intended functions, they are not as cost effective as could be. Rather, additional manufacturing steps are required in order to make the laminate structure non-adherent at specified areas.

It can be seen from the foregoing that a need exists for a new seal structure for an IV bag or a bottle, where the seal is more economically made and thus cost effective. Another need exists for a new seal that provides additional visual indications of tampering.

SUMMARY OF THE INVENTION

In accordance with the principles and concepts of the invention, there is disclosed a seal, and method of manufacture thereof, for use with medical and other containers.

In accordance with an important feature of the invention, the seal is manufactured in an in-line process using a roll of a laminate material and a roll of peel strip material, screen printing an adhesive in a patterned manner on the peel strip, and then bringing the laminate and the peel strip together under compression to form a long composite strip. A rotary die cutter cuts the laminate and the adhesive to form the individual seals on the peel strip. In accordance with an important feature, the adhesive is screen printed to form areas free from adhesive, which are the target area and the pull tab area of the seal. In accordance with another feature, the adhesive is colored so as to visually define the areas free of adhesive on the seal.

In accordance with another feature of the invention, a seal is disclosed having a laminate body portion and a pull tab portion. The seal is adhered to a peel strip for easy removal thereof when used to seal a container. The body portion has an adhesive free area defining a target area. The pull tab also has an adhesive free area for grasping the same for removal of the seal from the peel strip.

In accordance with another embodiment of the invention, disclosed is a seal for use in providing a protective cover for a container of the type having an opening therein. The seal includes a flexible material of a size for covering the opening of the container; a film of an adhesive material adhering to a side surface of the flexible material except for an area free of the adhesive, the area being surrounded by said adhesive; and a peel strip with one side surface attached to the adhesive, the side surface of the peel strip is formed of a material for allowing release of the adhesive when the flexible material is pulled away from the peel strip.

In accordance with yet another embodiment of the invention, disclosed is a method of fabricating a seal of the type providing a removable protective cover for an opening of a container. The method of fabricating the seal for sealing around the opening of the container includes forming an adhesive area encircling an adhesive free target area of the seal, and attaching a removable peel strip to the adhesive to protect the adhesive free target area from contamination. Further included is the use of an adhesive that does not change color after application of the adhesive to said seal, and forming the seal so that the adhesive free target area is visually distinguished by color from the surrounding adhesive area by a person applying the seal to the container. As a result, when the peel strip is removed, the adhesive free target area is easily visually distinguished from the surrounding adhesive so that the adhesive free target area of the seal can be visually aligned with the container opening and manually applied thereover. The surrounding adhesive portion of the seal can be attached around the container spout, and at least a portion of the seal can be removed from the container to access contents via the opening in the container.

With regard to yet another embodiment of the invention, disclosed is a method of fabricating a seal of the type providing a removable protective cover for a container having a spout with an opening covered by a membrane. The method includes forming a laminate seal structure by adhering a material strip to a peel strip, and adhering the material strip to the peel strip using an adhesive with a colored agent added thereto to achieve a desired color to the adhesive that is visually distinguished from a color of a surface of the material strip to which the colored adhesive is adhered. A colored adhesive is used that does not change color when the seal is removed form the container. The colored adhesive is applied to the laminate seal structure so that the colored adhesive surrounds an adhesive free area on the surface of the material strip and the color of the adhesive visually distinguishes the adhesive free area on the surface of the material strip. An adhesive is used that allows the peel strip to be removed therefrom to expose the colored adhesive surrounding the adhesive free area of the material strip so that a user can visually identify the adhesive free area of the material strip and manually apply the adhesive free area thereof over the membrane of the spout without allowing the colored adhesive to adhere to the membrane of the spout. The user can attach the material strip around the spout of the container using the colored adhesive to adhere the material strip to the spout.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
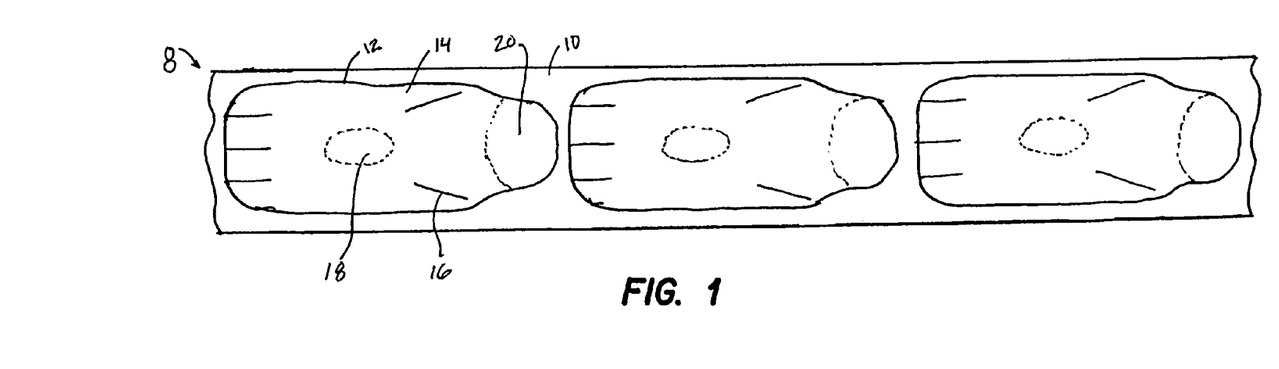
FIG. 1 is a top view of a strip of IV bag seals constructed according to a preferred embodiment of the invention.
Figure 2:
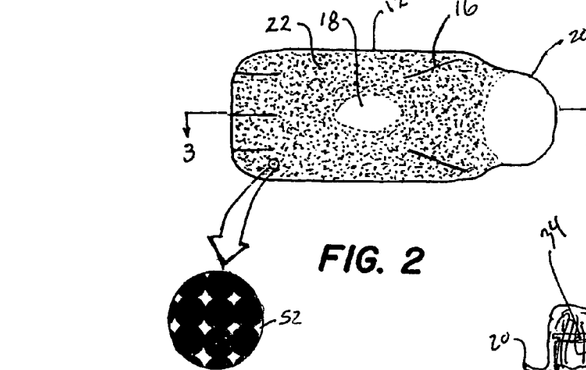
FIG. 2 is a bottom view of a seal subsequent to removal from the silicone-coated peel strip, with the adhesive pattern shown in enlarged form.

With reference to FIGS. 1 and 2, there is shown a strip 8 of IV bag seals 12 according to the invention. It should be understood that the seal 12 is well adapted for sealing medical containers other than IV bags. In any event, the seals 12 are adhered to a silicone-coated peel or release strip 10. When distributed to a pharmacy, hospital, clinic or other user, a strip 8 of about 1,000 seals are contained within a dispenser box or container, to be described below.

Each seal 12 is characterized as having a body 14 with one or more slits, one shown as reference character 16. The body portion 14 of the seal 12 includes a target area 18. The seal 12 further includes a pull tab 20 for use in removing the seal 12 from the peel strip 10 and handling the same without touching the underlying adhesive-coated area 22 shown in FIG. 2. The entire bottom surface of the seal 12 is coated with an adhesive 22, except for the target area 18 and the pull tab 20. The target area 18 is free from adhesive as it is undesirable to allow an adhesive to be placed in contact with the sterile rubber membrane of the IV bag injection port, or the port of a vial. The pull tab 20 is free from adhesive so that the seal 12 is easily gripped and removed from the peel strip 10. Unlike the prior art seals, the target area 18 and the pull tab 20 do not include paper-covered areas. The manner in which the adhesive 22 is transferred to the seal 12 is described in more detail below.

Figure 3:
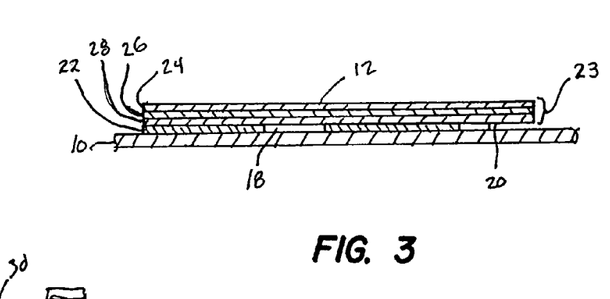
FIG. 3 is a cross-sectional view, taken along line 3-3 of FIG. 2.

The construction of a seal according to one embodiment is shown in FIG. 3. The seal 12 is constructed of a laminated structure 23 having a top polypropylene film 24, a middle layer of a metal foil 26 and a bottom film 28 of polypropylene. The top and bottom polypropylene films 24 and 28 can be about six mils thick. The metal foil 26 can be a silver-colored aluminum metal of about seven mils thickness. Other materials formed of other thicknesses can be used as the laminated structure. Such structures are well known in the art of seals for medical containers. Indeed, the seal 12 may be constructed of a single layer of material. In order to visually distinguish seals for different uses, a colored film can be applied between the top polypropylene layer 24 and the metal foil 26. Moreover, the top polypropylene layer 24 can be colored so as to be easily identified. The bottom polypropylene layer 28 can also be colored.

The laminated structure 23 is releasably attached to the silicone-coated peel strip 10 by an adhesive 22 which, in the preferred embodiment, is colored. The colored adhesive 22 visually defines the target area 18, as shown in FIG. 2. The adhesive 22 does not adhere to the silicone surface of the peel strip 10, but does adhere to the lower surface of the bottom polypropylene film 28. As such, when the laminate structure 23 is pulled from the peel strip 10, the adhesive 22 remains with and becomes part of the seal 12. As shown in FIG. 2, the target area 18 and the bottom side of the pull tab 20 are free from adhesives.

Figure 4:
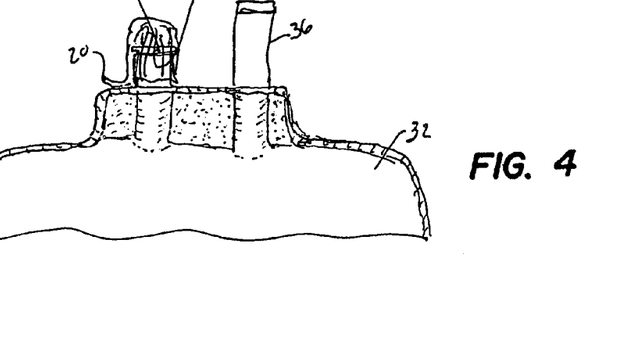
FIG. 4 is a side view of a portion of an IV bag, with the seal fixed thereto.

In use, when the pharmacist needs a seal for sealing a completed IV bag 32, the seal 12 is removed from the peel strip 10. The pharmacist then visually locates the target area 18, and applies the seal 12 to the spout 30, making sure the target area 18 is centered over the rubber membrane 34. This is shown in FIG. 4. In addition, the pharmacist can wrap or fold the seal 12 down around the spout 30. As noted above, the existence of the seal on the IV bag 32 conveys the message that the contents of the IV bag 32 have been altered or modified according to the preprinted label instructions, and the IV bag is ready to be transferred to the hospital or clinic. In the event that the seal 12 is attempted to be removed from the spout 30 of the IV bag 32, telltale signs of tampering are two fold. First, the seal 12 will be destroyed as one or more of the slits 16 will cause tearing of the body 14 of the seal 12. Secondly, portions of the colored adhesive 22 will remain on the spout 30 or the IV bag itself 32. The residue of the colored adhesive 22 is readily apparent on clear plastic sidewall of the IV bag. The IV solution is dispensed via the IV port 36.

The manufacture of the seal 12 is described in detail below, and shown schematically in FIG. 5. A long, wide roll 40 of a silicone-coated peel strip material 10, and a long, wide roll 42 of a laminate material 23 constitute the starting materials for the in-line process. It should be understood that the laminate structure 23 of the seal 12 can be other materials, and can even be a single layer or film of material. The width of both rolls 40 and 42 of material is preferably sufficient to make a plurality of seals per unit width of material. In the preferred embodiment, a unit width of material is sufficient to make 7-9 seals 12. The shape of the seals in a unit width may be different from that shown in FIG. 1. The silicone-coated peel strip 10 undergoes a process where a colored adhesive 22 is patterned onto the silicone side of the strip 10. The adhesive 22 can be of a hot melt type, a solvent, acrylic or other type suitable for use with screen print equipment. A colored pigment is added to the adhesive 22 to impart a color thereto. The colored pigment can be in a powder or liquid form, such as a colored ink compatible with the type of adhesive employed. The process includes a screen printer utilizing a mesh roller 44 having small openings formed in a pattern with the shape shown by the adhesive-coated area 22 of FIG. 2. The pattern is repeated around the mesh roller 44. Importantly, no adhesive 22 is deposited in the areas corresponding to the target area 18 or the pull tab 20. In a preferred embodiment, the colored adhesive 22 is screen printed on the silicone peel strip 10, not the laminate structure 23 of the seal 12. Alternatively, the adhesive 22 can be screen printed on the laminate structure 23. The colored adhesive 22 is forced through small holes in the roller 44, whereupon a dot pattern 45 of a desired thickness of adhesive 22 is transferred to the peel strip 10. The thickness of the colored adhesive is on the order of between about 0.9-1.10 mils, plus or minus 0.1 mil. With such a thin layer of adhesive, the adhesive is used efficiently without compromising the adhering strength of the adhesive material. Because of the thin film of adhesive utilized, the coloring agent added thereto should be substantial so that the thin film of adhesive is visually distinguished from underlying the laminate structure to which it is adhered. Without the use of a coloring agent, it is believed that a raw adhesive material coated as a thin film on a substrate would not be visually distinguished from the underlying substrate. The dot pattern 45 may be as shown in the enlargement 46 of FIG. 5. The adhesive 22 can be applied in other patterns, such as crosshatching, etc. The adhesive 22 used is colored before being applied to the seal 12, and does not change color once applied to the seal 12. For example, the adhesive 22 does not change color either when the peel strip 10 is removed, or when the seal 12 is removed from the container.

In the process, the adhesive patterned side of the wide peel strip 10 is brought into contact with the laminate structure 23, and pressed together with a pair of spaced-apart rubber nip rollers 50*a* and 50*b*. The nip rollers 50*a* and 50*b* squeeze the materials 10 and 23 together sufficiently to cause the adhesive dot pattern 45 to be compressed. When compressed, the adhesive 22 adheres to the surface of the polypropylene layer 28. This compression step essentially transfers the adhesive 22 from the peel strip 10 to the laminate structure 23. After compression, the adhesive dot pattern 45 is merged together, much like that shown in the enlargement 52 of FIG. 2. The diameter of the patterned dots 45, as well as the thickness of the adhesive 22 can be adjusted to achieve the merged pattern of FIG. 2. The merging of the adhesive dot pattern 45 is important to prevent any passages or channels between target area 18 and the environment. The presence of any passages could lead to the migration of bacteria and the like to the target area 18 and contamination thereof.

The continuous roll material adhered together is coupled to a rotary die cutter station. The rotary die cutter includes a roller 54 with an engraved cylinder, where the cutting pattern is repeated in all rows around the peripheral surface of the cutting roller 54. The rotary die cutter is removable and replaceable with another cutter having different shaped engraved patterns to produce seals with different shapes. It is understood that when using different shaped seals, the adhesive pattern screen would also be different to match the shape of the pattern of the rotary die cutter. In addition to cutting the outer edge of the seal 12, the cutter also cuts the tear slits 16. The rotary die cutter 54 is synchronized with the adhesive pattern on the peel strip 10 so that the outline cut for each seal 12 corresponds to the outline of the adhesive pattern. Synchronization of the various in-line stations is achieved by the use of gear-driven equipment. The number of engraved areas in a unit width of the rotary die cutter 54 is a function of the width of the roll material 10 and 23. FIG. 5 illustrates that there are four seals cut per unit width. The rotary die cutter 54 operates in conjunction with a smooth surface roller 56. The spacing between the cutting edge of the engraved areas and the surface of the roller 56 is such that the cuts are made entirely through the laminate structure 23, as well as through the layer of adhesive 22. The only material that is not cut is the peel strip 10.

The waste laminate material and associated adhesive is removed by a processing station, not shown, and wound onto a waste roll and disposed of appropriately. The remaining composite material strip 58 that proceeds in the processing of the invention is the wide peel strip 10 with the individual seals 12 attached thereto. The wide material 58 is wound onto a roll several thousand feet long. The roll is then placed on a rewinding machine (not shown) that slits the rows apart and winds the product onto a core with the desired number of seals on the roll, such as 1,000 seals per roll. This avoids interrupting the machine each time a roll of 1,000 seals is completed. In the example, the wide strip 58 is made with four seals across the width of the material strip 58, and thus there are three rotary knives to cut the wide strip 58 into four individual strips, one shown as numeral 62. The individual strips 62 are of a width having only a single seal 12, although this is not a necessity. In the event that the user desires to have strips of two or more seals wide, this can be accommodated by configuring the rotary cutter 60 with the appropriate number of cutting blades.

The individual seal strips 62 are wound onto individual spools. One spool is shown as numeral 64. The spools of seal strips 62 are placed into respective dispenser boxes or containers, such as would be used by the pharmacist when placing the seals 12 on the injection ports of IV bags. A clam shell type of plastic container can be used to provide a dispenser box when the roll of seals 12 is placed therein. The end of the strip of seals can be threaded through an exit opening in the plastic container, and the clam shell halves snap locked together. The individual containers of seals 12 are next sterilized to remove all bacteria and germs from the product. If a box is used as a container, then the spool of seals can be held in a plastic holder housed within the box to allow rotation of the roll of seals during dispensing. The sterilization of boxed rolls of seals 12 can be carried out in any conventional manner. In the preferred form, the boxed rolls of seals 12 are placed in a vented plastic bag and placed in a sterilization chamber. A sterilizing agent, such as ethylene oxide gas, is injected into the chamber at a specified temperature, pressure and humidity, for a specified time to destroy all bacteria. This type of sterilizing gas permeates through the various materials of the seal 12 and is effective to sterilize the target area 18. The sterilizing gas is then removed from the chamber. The boxes remain in the bags and are made ready for shipment to the users of the seals 12.

Figures 5, 6, 7:
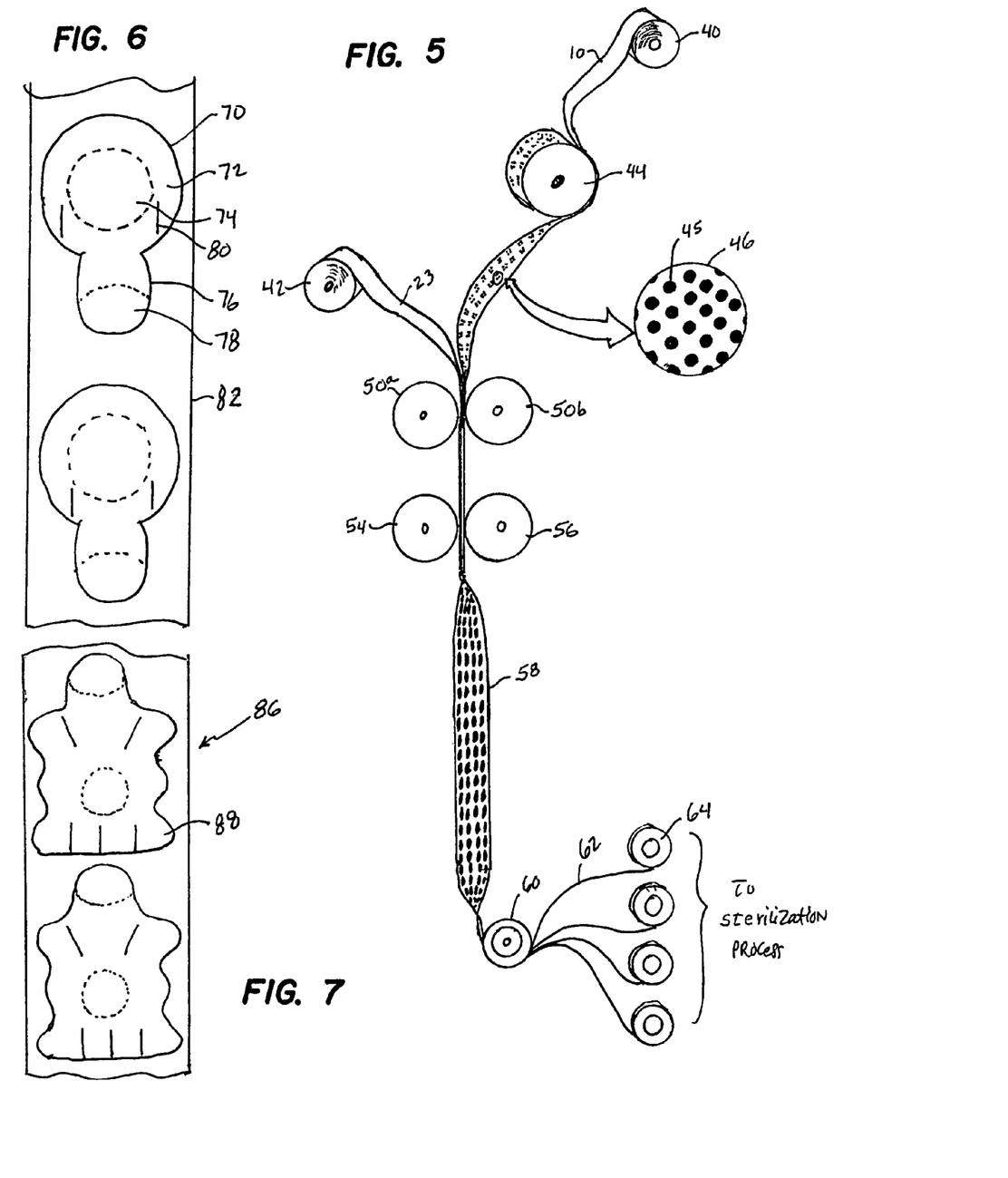
FIG. 5 is a diagram of an in-line manufacturing process adapted for fabricating the seals of the invention.
FIG. 6 illustrates another embodiment of a seal according to the invention.
FIG. 7 illustrates yet another embodiment of a seal according to the invention.

FIG. 6 illustrates another embodiment of the invention well suited for use with bottle containers holding medical drugs and the like. Bottles of this type have a rubber membrane held within the opening of the bottle by a metal rim. The seal 70 has a round body 72 with a round target area 74 free of adhesive. The round body 72 of the seal 70 is well adapted for attachment to the rim over the rubber membrane. The bottom side of the seal body 72 is coated in a dot pattern of a colored adhesive in the manner described above. The body 72 of the seal 70 can be adhered to the metal rim and/or to the neck of the bottle. A pull tab 76 includes on a bottom surface an adhesive free area 78 for allowing a user to easily grasp the seal 70 and remove it from the peel strip 82. One or more slits 80 are provided for allowing the body 72 of the seal to be easily torn should it be attempted to be removed from the bottle. The seal 70 can be made in the same manner described above, except with a different pattern for the adhesive dispensing screen 44, and a different shape engraved cylinder on the rotary die cutter 54.

FIG. 7 illustrates a shape of yet another seal 86 constructed according to the concepts of the invention described above. The shape of this seal 86 is readily adapted for use with an IV bag having a side injection port. The multiple ears 88 can be folded to conform around the side injection port.

Figure 8:
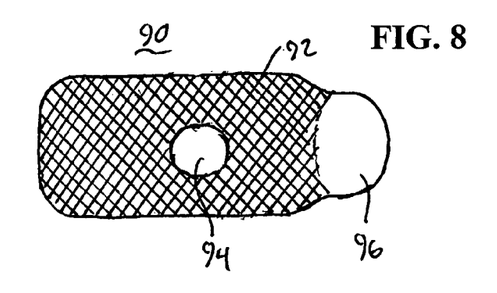
FIG. 8 illustrates the metal foil portion of a seal, patterned with a color agent to color the foil area, except the target area and the pull tab area.

In accordance with another embodiment, FIG. 8 illustrates a seal 90 constructed so that there is a prominent visual distinction between the adhesive-covered areas and the adhesive-free areas. The cross-hatched area 92 depicts an area of the seal that is colored, whereas the areas 94 and 96 that are not cross-hatched depict areas of the seal 90 that are not colored. The area 94 represents the target area of the seal 90, and the area 96 represents the pull tab for grasping to remove the peel strip, not shown. The coloring of the pull tab 96 area is optional. According to this embodiment, the metal foil portion of the seal 90 is fabricated to impart a color to only the cross-hatched areas 92, and leave the other areas 94 and 96 free of the color. In other words, the areas 94 and 96 will remain a neutral aluminum foil color, such as a shiny silver color having a chrome-like appearance. The cross-hatched area 92 can be colored any brilliant color, such as green, red, blue, yellow, purple, orange, etc.

During processing of the components of the seal 90, one side of the metal foil can be passed by a color agent dispenser to color selected areas of the metal foil. An ink, stain, paint or other color agent can be applied to the cross-hatched area 92, and leave the other areas 94 and 96 free of the color agent. Techniques exist where a liquid color agent can be jetted onto the side of the metal foil at selected areas. As such, the liquid color agent can be jetted as a large number of high density dots onto the metal foil in the area 92. As an alternative, the color-free areas 96 and 94 can be masked with respective adhesive patches applied to the metal foil, and a color agent sprayed onto the entire side of the metal foil. Then, the adhesive patches can be removed to expose the color-free areas 94 and 96 of the foil material. Another method of coloring the surface of the metal foil is to screen print a colored agent onto the foil surface, where the screen is patterned to only allow the color agent to be applied to the cross-hatched area 92. An ink, dye or paint can be used as the color agent during the screen printing process.

A roll of the metal foil can be processed to apply the color agent in a patterned manner to the one side of the foil material. This can be carried out prior to the lamination of the same to other materials, such as one or more layers of polypropylene. The colored metal foil can then be rolled back up into a roll and used for subsequent processing to form the complete seal, as described above. The roll of the color-patterned seals can then be used during the normal lamination process where the peel strip is adhered to the metal foil to from the composite seal 90. The adhesive can be applied as a thin film, and thus is very transparent to thereby allow the colored surface thereunder to be easily seen. It is well within the skill of those in the art to time or otherwise control the movement of the roll of the colored metal foil so that an adhesive is applied only to the colored areas 92 of the metal foil, and not applied to the color-free areas 94 and 96. As noted above, the patterned adhesive can be applied to the peel strip, and then the peel strip registered with the metal foil and pressed onto it to adhere the layers together until the peel strip is removed by the user of the seal. The adhesive can also be applied in a patterned manner directly to the colored surface 92 of the metal foil, and then the peel strip pressed onto the adhesive. The cutting of the laminate structure to the desired shape can be carried out in the manner described above.

It can be appreciated that the color-free areas 94 and 96, and especially the target area 94, are visually distinguishable to a great extent from the surrounding colored area 92. This allows a user of the seal 90 to easily align the target area with the spout of a container or vial and apply the same thereto without allowing the adhesive covered areas to touch the spout membrane. As noted above, this is important when applying a seal to a medical container and preventing the adhesive from being transferred to the membrane of the container spout.

Figure 9:
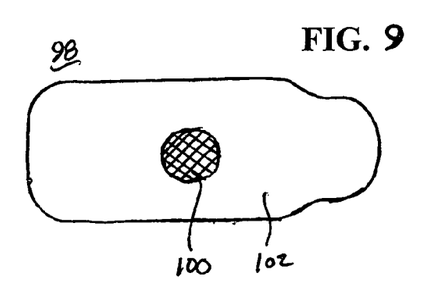
FIG. 9 illustrates the metal foil portion of a seal, patterned with a color agent to color only the target area.

FIG. 9 illustrates another embodiment of the metal foil layer of a seal 98, where the color agent is applied only to the target area 100, and not to the remainder of the metal foil layer. Similar processing can be carried out in the manner described above, but instead applying the color agent only to the target area 100. Again, the seal 98 of this embodiment has a target area 100 that is highly distinguishable from the color-free areas 102, to thereby facilitate alignment of the seal 98 when applying the same to a container.

In either of the embodiments of FIGS. 8 and 9 described above, it is easy to form selected areas of the seal 90 or 98 with a highly colored appearance to more easily distinguish the target area of the seal from the surrounding area. The deep coloring of the metal foil is much easier to achieve than forming a very thin layer of colored adhesive so that the color thereof is deep and easily distinguishable from the non-adhesive areas. However, those skilled in the art may find it advantageous to use both a colored metal foil (patterned or not) as well as a colored adhesive. The color agent added to the adhesive can be micron-size particles, or other suitable size particles, mixed with the adhesive to provide a visual distinction with the surrounding non-adhesive areas. The particles can be silver colored to provide a reflectivity to the adhesive that is otherwise not a characteristic of the adhesive. To that end, the reflective or colored particles can be mixed so that the density thereof is substantially high in the adhesive to provide a highly reflective surface for the adhesive.

In order to provide a visual distinction between the target area of the seal, as compared to the surrounding areas, the surface of the metal foil can be altered to change the reflectivity thereof. For example, when using a metal foil having a shiny silver surface, the surface of the foil forming the target area can be altered or spoiled to change the reflectivity thereof.

Figure 10A:
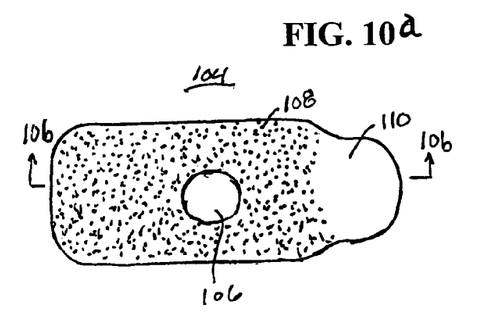
FIG. 10a is a top view of a seal according to another embodiment, in which the reflective properties of the adhesive are used to distinguish from the adhesive-free target area.
Figure 10B:
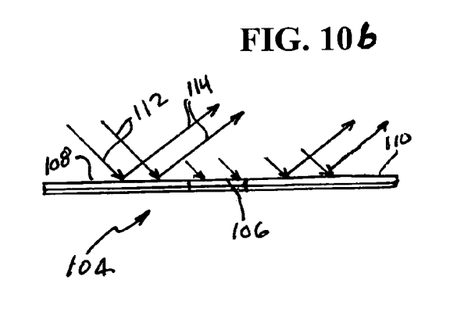
FIG. 10b is a cross-sectional view of the seal of FIG. 10a, taken along line 10b-10b, which illustrates the use of reflective properties of the adhesive.

FIGS. 10a and 10b illustrate a seal 104 constructed according to another embodiment. Here, the reflective properties of the adhesive of the seal 104 are used to distinguish the target area 106 and the pull tab 110 from the surrounding adhesive-covered area 108. The adhesive used in this embodiment can be modified to alter the normal properties thereto for increasing the reflectivity thereof. There are currently available adhesives that exhibit unique reflective properties. Such adhesives are available from 3M, including reflective inks that can be added to adhesives. When using an adhesive with reflective properties, the adhesive-covered area can be visually distinguished from the target area. The use of a reflective adhesive can also be used in combination with a target area that has a reduced reflective characteristic. The reflectivity of the target area can be reduced by spoiling the smooth and shiny surface thereof. The reflectivity of the target area can be spoiled by slightly etching the area to reduce the shiny characteristic. The reflectivity of the target area can also be spoiled by using a dull or flat paint, ink or other liquid that can be selectively applied to the target area of the seal. Many other methods can be used to reduce the reflectivity of the target area.

With regard to FIG. 10b, there is illustrated a sectional view of the seal 104 of FIG. 10a. The top of the seal 104 illustrates the adhesive layer. The bottom of the seal 104 illustrates the laminated structure which includes a metal film and one or more layers of polypropylene. When utilizing an adhesive with reflective properties, the light 112 striking the side of the seal 104, as shown, is reflected 114 off of the adhesive 108 and can be seen by the user attempting to apply the same to the spout of a container, or vial port. The reflections 112 of the light rays appear shiny to the observer. It can be seen that the light rays 116 striking the target area 106 are not reflected, or at least are reflected with reduced intensity. As such, the user of the seal 104 can more easily distinguish the target area 106 from the surrounding adhesive area 108 and more easily apply the same to a container.

As an alternative to the modification of the reflective properties of the adhesive, other visual characteristics can be considered when choosing an adhesive. For example, adhesives that are responsive to certain wavelengths of light can be used. An adhesive that absorbs certain wavelengths of light, while the target area does not, can be used as a mechanism to provide visual distinction between the areas.

From the foregoing, disclosed is a seal, and method of manufacture thereof, which overcomes many of the shortcomings of the seals made according to the prior art. The seal according to the invention does not require paper to provide adhesive-free areas. Rather, the seal of the invention initially deposits the adhesive in a pattern so that there is no adhesive where none is desired. In addition, in the process of making the seal of the invention, the adhesive is applied to the peel strip, and then transferred to the laminate seal structure. The adhesive can be colored to provide a telltale indication of removal of the seal from a container. In addition, the colored adhesive is advantageous in visually defining the target area of the seal. These and other features will be apparent from the foregoing description of the invention.

While the preferred and other embodiments of the invention have been disclosed with reference to a specific seal and method of manufacture thereof, it is to be understood that many changes in detail may be made as a matter of engineering choices without departing from the spirit and scope of the invention, as defined by the appended claims.

What is claimed is:

1. A method of fabricating a seal of the type providing a one-time removable protective cover for a medical container of the type having an opening with a membrane, said method comprising:

fabricating the seal for sealing around the opening of the container, including using machine equipment for forming an adhesive area encircling an adhesive free target area of the seal, and using machine equipment for attaching a removable peel strip to the adhesive to protect the adhesive free target area from contamination;

using an adhesive that does not change color upon removing said peel strip;

forming the seal so that the adhesive free target area is visually distinguished by color from the surrounding adhesive area by a person when manually applying the seal to the container for a first time and only a single time;

spoiling the target area to reduce reflectivity thereof;

forming the adhesive area of said seal with a desired color by adding a color agent to the adhesive to achieve the desired color;

forming the seal so that it is destroyed on removal thereof from the container and cannot be resealed to the container; and whereby when the peel strip is removed the adhesive free target area is easily visually distinguished from the surrounding colored adhesive and the adhesive free target area of the seal can be visually aligned by a person with the membrane of the container opening and manually applied by the person thereover without placing the adhesive on the membrane, and the adhesive portion of the seal surrounding the adhesive free area can be attached to the container, and at least a portion of the seal can be removed from the container to access contents via the container membrane.

2. The method of claim 1, further including:
using a layer of adhesive of about one mil thick; and
using a sufficient amount of a colored agent in the adhesive to provide a desired colored appearance thereto that is visually distinguished from a color of the of the target area formed by a surface of the flexible material to which the adhesive is adhered.

3. The method of claim 1, further including using the adhesive having a reflective material added thereto to provide a light reflective property to the adhesive, and said target area does not have said reflective material, whereby the target area is visually distinguished from the reflective adhesive area of said seal.

4. The method of claim 1, further including dulling a shiny surface of a foil layer, where the dulled surface of the foil defines the target area.

5. The method of claim 1, further including providing a color to said target area where the color of said target area is visually distinguished from the surrounding adhesive area.

6. The method of claim 5, further including forming the seal using a laminate structure which includes a foil of a first color, and using a foil that is colored with a second color at least in a surface area thereof which comprises said target area.

7. The method of claim 6, further including using a colored adhesive, where the color of the adhesive is different and visually distinguishable from the color of the surface of the foil.

8. The method of claim 7, further including using a foil with one entire surface thereof colored, where said colored adhesive is adhered to the colored surface of said foil.

9. The method of claim 1, further including using an adhesive having small particles of a material that provides a visual distinction from the target area of said seal.

10. The method of claim 9, further including using particles of a glitter type material.

11. The method of claim 1, further including forming the target area so that it is visually distinguished from the surrounding adhesive covered area by selecting from the group of;
1) forming the adhesive area with a different color as compared to a color of the target area;
2) forming the adhesive with light reflective properties, as compared to a light reflectivity of the target area;
3) forming the target area with a color defined by a colored surface of a foil material which forms at least a part of a laminate structure of the seal;
4) forming the adhesive with light reflective glitter particles in said adhesive; or
5) using a neutral colored adhesive and coloring the target area a brilliant color.

12. A seal fabricated according to claim 1.

13. A method of fabricating a seal of the type providing a removable protective cover for an opening of a container, said method comprising:
fabricating the seal for sealing around the opening of the container, including forming an adhesive area of said seal encircling an adhesive free target area of said seal;
sterilizing the adhesive free area of the seal;
attaching a removable peel strip to the adhesive area of said seal to protect the sterilized adhesive free target area from contamination;
coating the adhesive area of said seal, but not the target area, with an adhesive;
spoiling the target area to reduce reflectivity thereof to thereby;
fabricating the seal so that it is destroyed on removal thereof from the container and cannot be resealed to the container; and
whereby when said peel strip is removed from said seal, light is reflected differently from said adhesive area as compared to said spoiled adhesive free target area so that the adhesive free target area is visually distinguished from said adhesive area and the adhesive free target area of the seal can be visually aligned with the container opening and manually applied thereover, and the surrounding adhesive portion of the seal can be attached to the container, and at least a portion of the seal can be removed from the container to access contents via the opening in the container.

14. The method of claim 13, further including dulling a shiny surface of a foil layer of said seal, where the dulled surface of the foil defines the target area.

* * * * *